Figure 1:
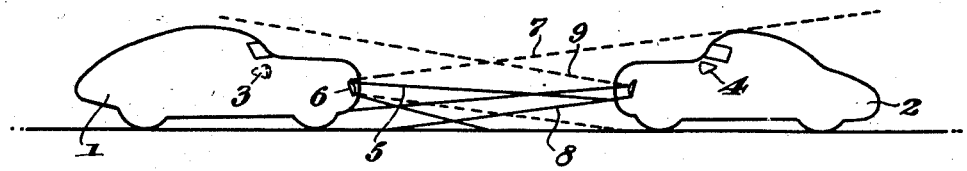

July 1, 1947.  F. WILLIS, JR  2,423,278

VEHICLE HEADLIGHT CONTROL SYSTEM

Filed April 26, 1945   3 Sheets-Sheet 1

Inventor
Floyd Willis, Jr.
By Mason & Maxfield
Attorney

July 1, 1947. F. WILLIS, JR 2,423,278
VEHICLE HEADLIGHT CONTROL SYSTEM
Filed April 26, 1945 3 Sheets-Sheet 2
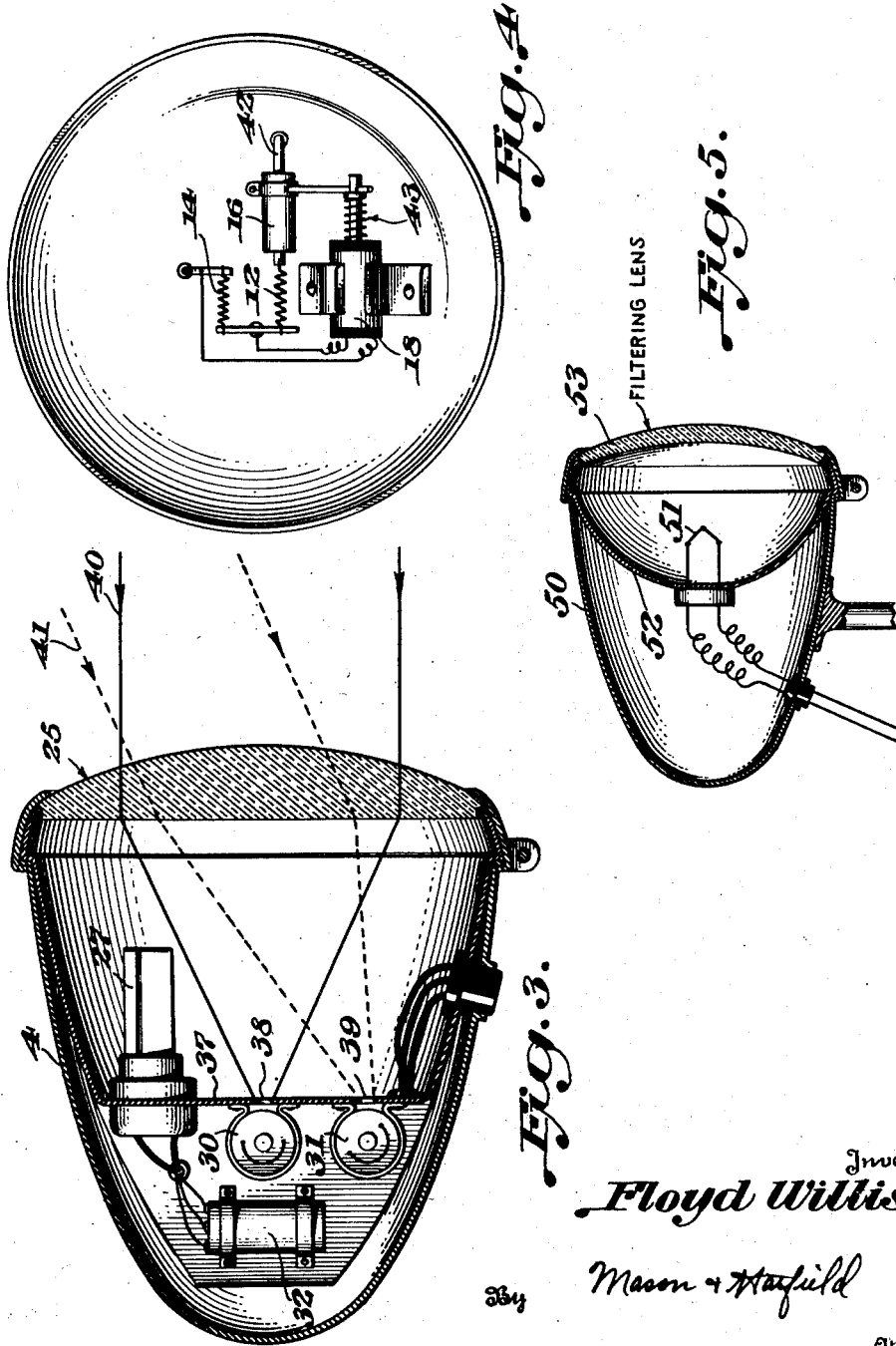

Patented July 1, 1947

2,423,278

UNITED STATES PATENT OFFICE 2,423,278

VEHICLE HEADLIGHT CONTROL SYSTEM

Floyd Willis, Jr., Dallas, Tex.

Application April 26, 1945, Serial No. 590,487

20 Claims. (Cl. 315—82)

The present invention relates to an automobile headlight system in which means is provided for automatically dimming or deflecting the visible rays of the headlights when approaching an opposing vehicle whose headlights are energized.

It has previously been attempted to provide an automobile headlight system with means for automatically dimming or deflecting the headlights of approaching cars in order to avoid the blinding glare encountered by the opposing drivers when using their ordinary bright or driving lights. The previous systems relied upon the bright light rays from the headlight of the oncoming car to actuate the automatic headlight dimming system of the approaching car and if the oncoming car had previously dimmed or deflected its headlight it was found that the dimming system of the approaching car would not be provided with sufficient radiant energy to be actuated. This is a major disadvantage of the previous automatic headlight dimming systems which the system of my invention is intended to overcome. Furthermore, the previous systems for automatically dimming the headlights were unreliable in that they required a source of bright visible light rays for continued actuation and should the actuating light source be dimmed the actuated source would not be dimmed and in the case of approaching or opposing vehicles this would result in a condition of oscillation of the headlights of the approaching vehicles being alternately dimmed and brightened. Obviously, such systems are not suitable for general application and I therefore propose by my invention to provide an automatic headlight dimming system which will be responsive to an invisible radiation source that is not reduced in intensity even though the driving lights may be dimmed or deflected to thus avoid the disadvantages previously referred to.

It is therefore a principal object of my invention to provide an automatic headlight dimming system which is responsive to the invisible radiations from the headlights of an approaching vehicle which also may be equipped with the dimming system of my invention to dim or deflect the visible rays of the headlights without dimming or reducing in intensity the invisible radiations of the headlights so that there will always be sufficient energy to actuate the similar headlight dimming system on the opposing vehicles.

It is a further object of my invention to provide a headlight dimming system of the type referred to above in which a light sensitive element responsive to invisible light radiations is employed to detect the radiation from the headlight of an oncoming car and actuate the dimming system of the approaching car and in which additional light sensitive means responsive to the general amount of radiation in the vicinity of said first mentioned light sensitive element is used to determine the theshold sensitivity of the first mentioned light sensitive element and its automatically actuated system.

Figure 2:
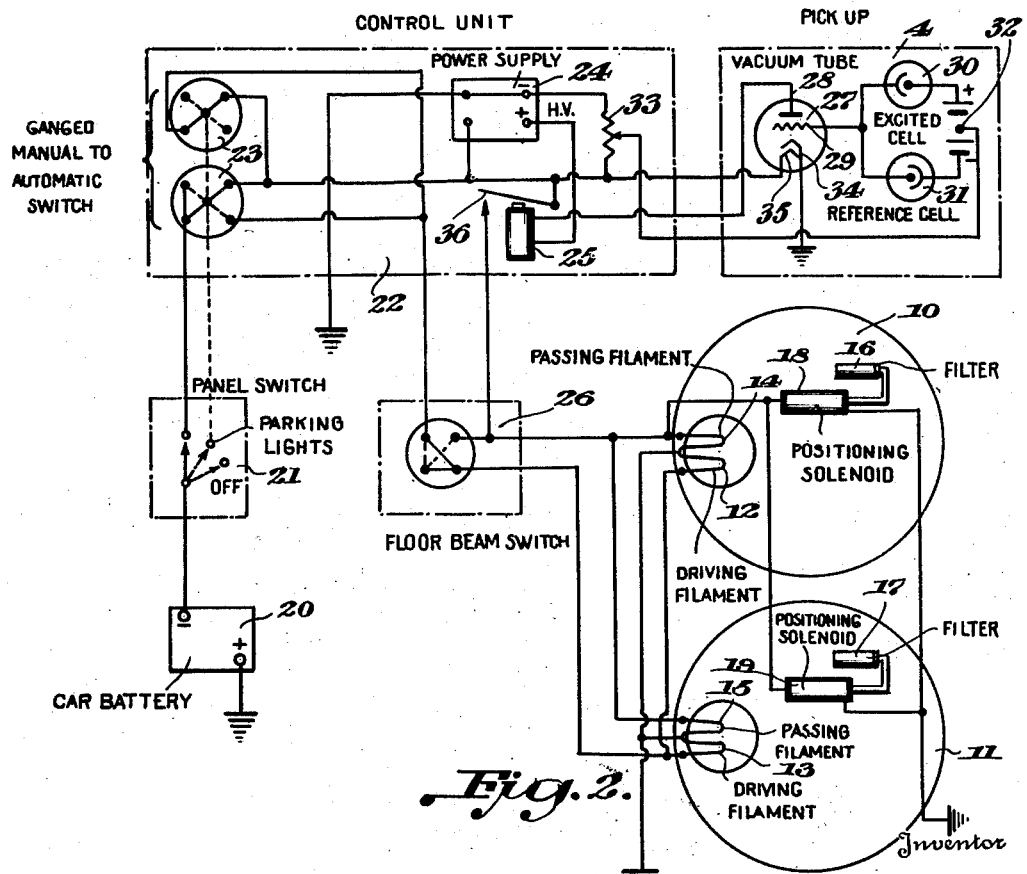
Figure 6:
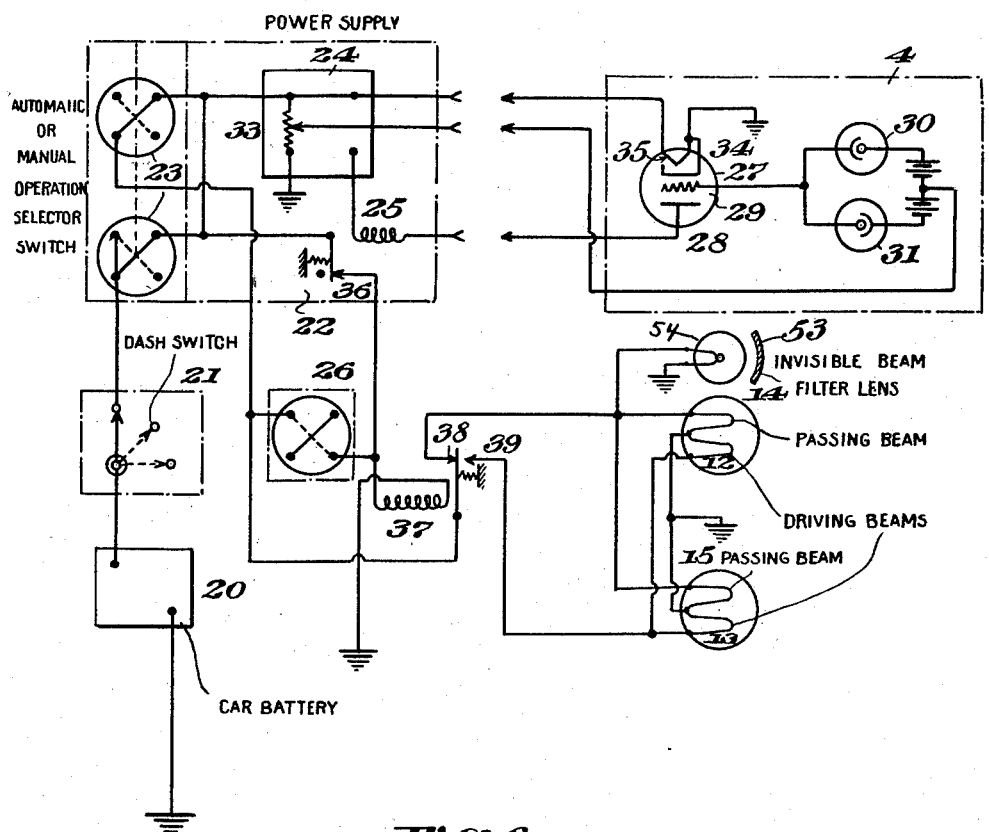

Further objects and advantages of my invention will be apparent by reference to the following specification and drawings in which, Figure 1 is an elevational view showing approaching vehicles equipped with the headlight dimming system of my invention, Figure 2 is a schematic wiring diagram of the invention, as shown in Figures 1, 3 and 4, Figure 3 is a transverse section of the pick-up or detecting element of my invention, Figure 4 is a front elevation of a headlight with the lens removed equipped with the dimming apparatus of my invention, Figure 5 is a transverse section of a source of invisible radiation used in a modification of the invention, and Figure 6 is a schematic wiring diagram of a modification of the invention as illustrated in Figure 5.

For a general understanding of the invention, reference is made to Figure 1 of the drawings which shows a pair of approaching vehicles equipped with the automatic headlight dimming system of my invention. The automobiles 1 and 2 are provided with photo-electric detecting or pick-up elements 3 and 4 which are preferably mounted on the left-hand or driver's side of the car body. The photo-electric detectors are of a type which are responsive to invisible light radiations such as the ultra-violet and/or infra-red in addition to the solid lines to be emanating from the headlights 6 of the automobile 1 are those from the so-called dim light filament which is so positioned with respect to the reflector and lens that the rays are deflected towards the ground as shown and do not reach the photo-electric detector unit 4 of automobile 2. The radiations shown by the dotted line 7 are emanating from the bright filament of headlight 6 which according to the teachings of my invention are projected through a filter to remove all of the visible radiation spectrum when the dim filaments are energized to provide the deflected visible light rays 5. It will be noted that due to the position of the bright filament with respect to its reflector and lens, the invisible radiations passed by the filter and represented by the dotted lines 7 are projected at the angle for reaching the photo-electric detector unit 4 of automobile 2 and that such angle is the normal angle for illumination of the road by the bright filaments with visible radiations when automobile 2 is not approaching. Automobile 2 is equipped with a similar pair of headlights to that described above in connection with automobile 1 and the deflected visible radiations are represented by the solid lines 8 while the non-deflected invisible radiations are shown in dotted lines 9. Since both cars 1 and 2 are equipped with the photo-electric detectors 3 and 4 responsive to invisible light radiations to actuate the headlight dimming system of my invention and filter out the visible radiations of the non-deflected headlight beams 7 and 9 while simultaneously energizing the deflected visible headlight beams it will be seen that all visible radiations from the headlights of the approaching cars will continue to be deflected from the driver's eyes while assuring sufficient amounts of invisible radiations for energizing the photoelectric systems to maintain the headlights in the deflected condition as long as the cars approach each other. After the cars have passed each other, the photo-electric units 3 and 4 will be deenergized since invisible light radiations are no longer reaching them and the automatic system of my invention to be further described in detail will then be responsive to deenergize the deflected headlight filaments and remove the filter units from in front of the bright or non-deflected headlight filaments to permit visible radiations of the non-deflected beam to be projected upon the road.

For a more detailed explanation of the automatic headlight dimming system reference is made to the schematic diagram of Figure 2. A pair of headlights 10 and 11 are provided with the driving or bright light filaments 12 and 13 and the passing or deflected light filaments 14 and 15. Filter elements 16 and 17, which are of any suitable material that is opaque to visible radiations but transparent to invisible radiations such as infra-red or ultra-violet rays, are so mounted within the headlights 10 and 11 that they may be moved into a position in front of the driving filaments 12 and 13 by the positioning solenoids 18 and 19 when it is desired that the visible radiations from the driving filament not be projected by the headlights and the deflected filaments 14 and 15 be energized. The filters 16 and 17 and their positioning solenoids 18 and 19 are shown only in diagrammatic layout by Figure 2 of the drawings and reference is made to Figure 4 which shows in detail the exact arrangement of the filter units.

The wiring arrangement of the automatic system is shown to include the battery 20 having a grounded positive terminal. The negative terminal connects with the panel switch 21 having positions for selectively energizing either parking lights (not shown) or the headlights and for deenergizing the light system. When the panel switch 21 is in position shown by the solid lines the negative terminal of the battery is connected to the control unit 22 of the headlight actuating and dimming system. The control unit 22 contains a two gang double pole double throw switch 23, a high voltage power supply 24, and a relay switch 25 for energizing the deflected headlight filaments and the positioning solenoids. The high voltage power supply may be of any suitable type such as the vibrator-rectifier type to convert the direct current battery potential of six volts to a potential of around 250 volts direct current for proper actuation of a vacuum tube to be described. The two gang double pole double throw switch 23 is used for selecting either manual or automatic operation of the headlight dimming system and when the switch is in the manual position represented by the dotted lines the power supply 24 is disconnected from the battery 20 and the negative terminal of the battery is connected to the floor beam switch 26 permitting manual selection of either the driving or passing visible radiation headlight beams. When the switch 23 is in the position shown by the solid lines the power supply 24 is connected to the battery and the automatic system is energized. It will be noted that in the automatic position of switch 23 a manual control of the automatic operation may still be obtained through the floor beam switch 26 except that the visible rays of the driving lights may not be projected when the photo-electric cell is actuated by an approaching vehicle as will be further described.

The operation of the modification illustrated in Figure 5 will be understood from the schematic diagram illustrated in Figure 6. Light from an oncoming vehicle strikes the phototube 30 which biases the vacuum tube 34 more positively, causing relay 25 to operate, thus closing contacts 36 which in turn causes relay 37 to switch from contact 39 to contact 38, thereby deenergizing the driving beam and energizing the passing beam as well as the invisible beam generator 54. Removal of light from the oncoming vehicle from photo-tube 30 causes the reverse of all of the above mentioned operation to take place and shuts off the passing filaments and invisible beam and restores the driving filaments.

The high voltage output of the power supply 24 is applied to the vacuum tube 27 mounted in the photo-electric pick-up unit 4. The vacuum tube 27 is preferably a triode and the positive terminal of the output of the power supply 24 is connected through the resistance of the relay coil 25 to the triode plate 28. The triode grid 29 is connected through the photo-electric cells 30 and 31 and their battery 32 to the bias potentiometer 33 connected across the positive and negative terminals at the output of the power supply 24. With the triode cathode 34 grounded as shown and the filament 35 energized by the battery 20, the bias on the grid 29 is adjusted by the potentiometer 33 so that with the photoelectric cell 30 not responding to a source of invisible radiations from approaching vehicles and balanced in output against a reference photoelectric cell 31, the plate current for triode 27 through the relay coil 25 will not be sufficient to actuate the relay and close the switch contacts 36.

I have described in connection with Fig. 2 of the drawings a pair of photo-electric cells 30 and 31 in the pick-up unit 4. This is a preferred embodiment of my invention although it is not necessary that the reference photo-cell 31 be used. With reference to Figure 3 of the drawings a detailed description of the photo-electric pick-up unit 4 will be made. Mounted behind the supporting plate 37 having apertures 38 and 39 are the photo cells 30 and 31. Also mounted on the plate 37 is the triode vacuum tube 27 and the bias battery 32 for the photo cells. It will be noted that the photo-cell 30 is so mounted behind the aperture 38 as to be repsonsive to the radiation 40 from the headlights of an oncoming vehicle while the photo-cell 31 is so mounted behind the aperture 39 as to be responsive to the general radiation in the vicinity of the pick-up unit 4. Thus with the photo-cells 30 and 31 connected in opposition to each other as shown by Figure 2 the photo-cell 31 acts as a reference cell to determine the threshold of sensitvity for photo-cell 30 in accordance with the amount of general radiation in the vicinity of the pick-up unit 4.

Referring to Figure 4 of the drawings a headlight unit embodying the automatically controlled filter unit 16 for the driving filament 12 is shown. The filter unit is adapted to move longitudinally on the supporting rod 42 when the positioning solenoid 18 and the deflected or passing filament 14 is energized to thus position the filter 16 around the driving filament 12. Since the filter 16 is of a material that is opaque to visible radiations but transparent to invisible radiations the driving filament 12 projects only its invisible rays when the passing filament 14 is energized. When the solenoid 18 is deenergized at the time that the passing filament 14 is deenergized, the spring 43 moves the filter 16 back to the position shown permitting the visible radiations from the driving filament 12 to be projected.

Considering now a detailed description of the operation of my invention with reference to Figures 2, 3 and 4 of the drawings, assume a pair of opposing and approaching automobiles equipped with headlight dimming systems of my invention. The photo-cell pick-up units are energized by the high voltage power supply and the manual-automatic switch 23 is in the automatic position with the bright or driving headlight filaments energized and projecting a beam of visible radiations upon the highway. As soon as the visible and invisible radiations from the driving beam of the opposing cars, as represented by 40 in Fig. 3, strike the photo-cell 30, the bias voltage on the grid 27 will be changed to render the tube 27 more conductive and increase the flow of current through the relay coil 25. This increase in current causes the switch contacts 36 to be closed, thus energizing the passing filaments 14 and 15 and the positioning solenoids 18 and 19 to position the filters 16 and 17 in front of the driving filaments 12 and 13. Thus a deflected beam of visible radiations will be projected as shown by Figure 1 while a non-deflected beam of invisible radiations will also be projected. Since the photo-cell pick-up units are responsive to the invisible radiations, continued increased conduction of tube 27 and actuation of the dimming relay 25 is assured until the opposing automobiles have passed. As previously mentioned the photo-cell 31 acts as a reference cell to determine the threshold of sensitivity for the headlight responsive photo-cell 30 with reference to the general illumination in the vicinity of the pick-up unit. If desired, the headlights may be manually deflected by the floor beam switch 26 and if the automatic control switch 23 is still in the automatic position the driving filaments will remain energized although filtered by the filter units to prevent the projection of visible radiations thus assuring a response to the invisible radiations by the opposing car's automatic headlight dimming system. This is in view of the fact that whenever the deflected or passing filaments are energized, the driving filament and filter positioning solenoid are also energized.

Figure 5 of the drawings relates to a modification of my invention in which a separate source of invisible radiations for actuating the headlight system of an oncoming vehicle is used. With this modification it is possible to use conventional headlights without the filter mechanism for the driving filament. An invisible radiation generator 54 comprising the housing 50 containing the filament 51, reflector 52 and filtering lens 53 is continuously energized when the passing beam automatic headlight dimming system is in use and is adapted to project a beam of invisible radiation in the direction of the pick-up unit of the opposing vehicle. Thus the conventional headlights may be automatically deflected while assuring a continued source of invisible radiation for energizing the pick-up units until the vehicles have passed each other.

It should be understood that my invention is capable of various modifications within the scope of the appended claims.

I claim:

1. In a vehicle headlight automatic controlling system for deflecting the visible radiations of the headlight beams of opposing oncoming vehicles, means on the vehicles for projecting a non-deflected beam of invisible radiations, means on one of the vehicles for projecting a non-deflected beam of visible radiations, and light sensitive means on the vehicles, said light sensitive means being responsive to said invisible radiations to automatically deflect the projected beam of visible radiations while continuing to project the non-deflected beam of invisible radiations.

2. In a vehicle headlight automatic controlling system for deflecting the visible radiations of the headlight beams of opposing oncoming vehicles, means on the vehicles for projecting a non-deflected beam of visible and invisible radiations, and light sensitive means on the vehicles, said light sensitive means being responsive to said invisible radiations to automatcally deflect the projected beam of visible radiations while continuing to project the non-deflected beam of invisible radiations.

3. In a vehicle headlight automatic controlling system for deflecting the visible radiations of the headlight beams of opposing oncoming vehicles, headlight means on the vehicles for projecting a non-deflected beam of visible and invisible radiations, and light sensitive means on the vehicles, said light sensitive means being responsive to said invisible radiations to automatically deflect the projected beam of visible radiations while continuing to project the non-deffected beam of invisible radiations.

4. In a vehicle headlight automatic controlling system for deflecting the visible radiations of the headlight beams of opposing oncoming vehicles, means on the vehicles for projecting a non-deflected beam of invisible radiations, headlight means for projecting both a beam of non-deflected and a beam of deflected visible radiation, and light sensitive means on the vehicles, said light sensitive means being responsive to said invisible radiations to condition said headlight means for projecting the deflected beam of visible radiations.

5. In a vehicle headlight automatic controlling system for deflecting the visible radiations of the headlight beams of opposing oncoming vehicles, means on one of the vehicles for projecting a non-deflected beam of visible radiations, means on the vehicles for projecting a non-deflected beam of invisible radiations, and light sensitive means on the vehicles, said light sensitive means including electronically controlled relay means and being responsive to said invisible radiations to automatically deflect the projected beam of visible radiations while continuing to project the non-deflected beam of invisible radiations.

6. In a vehicle headlight automatic controlling system for deflecting the visible radiations of the headlight beams of opposing oncoming vehicles, means on the vehicles for projecting a non-deflected beam of visible and invisible radiations, and light sensitive means on the vehicles, said light sensitive means including electronically controlled relay means and being responsive to said invisible radiations to automatically deflect the projected beam of visible radiations while continuing to project the non-deflected beam of invisible radiations.

7. In a vehicle headlight automatic controlling system for deflecting the visible radiations of the headlight beams of opposing oncoming vehicles, headlight means on the vehicles for projecting a non-deflected beam of visible and invisible radiations, and light sensitive means on the vehicles, said light sensitive means including electronically controlled relay means and being responsive to said invisible radiations to automatically deflect the projected beam of visible radiations while continuing to project the non-deflected beam of invisible radiations.

8. In a vehicle headlight automatical controlling system of deflecting the visible radiations of the headlight beams of opposing oncoming vehicles, means on the vehicles for projecting a non-deflected beam of invisible radiations, headlight means for projecting either a beam of non-deflected or a beam of deflected visible radiation, and light sensitive means on the vehicles, said light sensitive means including electronically controlled relay means and being responsive to said invisible radiations to condition said headlight means for projecting the deflected beam of visible radiations.

9. In a vehicle headlight automatic controlling system for deflecting the visible radiations of the headlight beams of opposing oncoming vehicles, means on the vehicles for projecting a non-deflected beam of invisible radiations, and light sensitive means on the vehicles, said light sensitive means including a first light sensitive element responsive to said invisible radiations to automatically deflect the projected beam of visible radiations, the light sensitive means also including a second light sensitive element responsive to the general amount of visible and invisible radiation in its vicinity for determining the sensitivity of the first mentioned light sensitive element.

10. In a vehicle headlight automatic controlling system for deflecting the visible radiations of the headlight beams of opposing oncoming vehicles, means on the vehicles for projecting a non-deflected beam of visible and invisible radiations, and light sensitive means on the vehicle, said light sensitive means including a first light sensitive element responsive to said invisible radiations to automatically deflect the projected beam of visible radiations, the light sensitive means also including a second light sensitive element responsive to the general amount of visible and invisible radiation in its vicinity for determining the sensitivity of the first mentioned light sensitive element.

11. In a vehicle headlight automatic controlling system for deflecting the visible radiations of the headlight beams of opposing oncoming vehicles, headlight means on the vehicles for projecting a non-deflected beam of visible and invisible radiations, and light sensitive means on the vehicle, said light sensitive means including a first light sensitive element responsive to said invisible radiations to automatically deflect the projected beam of visible radiations, the light sensitive means also including a second light sensitive element responsive to the general amount of visible and invisible radiation in its vicinity for determining the sensitivity of the first mentoned light sensitive element.

12. In a vehicle headlight automatic controlling system for deflecting the visible radiations of the headlight beams of opposing oncoming vehicles, means on the vehicles for projecting a non-deflected beam of invisible radiations, headlight means for projecting either a beam of non-deflected or a beam of deflected visible radiation, and light sensitive means on the vehicles, said light sensitive means including a first light sensitive element responsive to said invisible radiations to condition said headlight means for projecting the deflected beam of visible radiations, the light sensitive means also including a second light sensitive element responsive to the general amount of visible and invisible radiation in its vicinity for determining the sensitivity of the first mentioned light sensitive element.

13. In a vehicle headlight automatic controlling system for deflecting the visible radiations of the headlight beams of opposing oncoming vehicles, means on the vehicles for projecting a non-deflected beam of invisible radiations, and light sensitive means on the vehicles, said light sensitive means including a first light sensitive element responsive to said invisible radiations to actuate electronically controlled relay means and automatically deflect the projected beam of visible radiations, the light sensitive means also including a second light sensitive element responsive to the general amount of visible and invisible radiation in its vicinity for determining the sensitivity of the first mentioned light sensitive element.

14. In a vehicle headlight automatic controlling system for deflecting the visible radiations of the headlight beams of opposing oncoming vehicles, means on the vehicles for projecting a non-deflected beam of visible and invisible radiations, and light sensitive means on the vehicle, said light sensitive means including a first light sensitive element responsive to said invisible radiations to actuate electronically controlled relay means and automatically deflect the projected beam of visible radiations, the light sensitive means also including a second light sensitive element responsive to the general amount of visible and invisible radiation in its vicinity for determining the sensitivity of the first mentioned light sensitive element.

15. In a vehicle headlight automatic controlling system for deflecting the visible radiations of the headlight beams of opposing oncoming vehicles, headlight means on the vehicles for projecting a non-deflected beam of visible and invisible radiations, and light sensitive means on the vehicle, said light sensitive means including a first light sensitive element responsive to said invisible radiations to actuate electronically controlled relay means and automatically deflect the projected beam of visible radiations, the light sensitive means also including a second light sensitive element responsive to the general amount of visible and invisible radiation in its vicinity for determining the sensitivity of the first mentioned light sensitive element.

16. In a vehicle headlight automatic controlling system for deflecting the visible radiations of the headlight beams of opposing oncoming vehicles, means on the vehicles for projecting a non-deflected beam of invisible radiations, headlight means for projecting either a beam of non-deflected or a beam of deflected visible radiation, and light sensitive means on the vehicles, said light sensitive means including a first light sensitive element responsive to said invisible radiations to actuate electronically controlled relay means and to condition said headlight means for projecting the deflected beam of visible radiations, the light sensitive means also including a second light sensitive element responsive to the general amount of visible and invisible radiation in its vicinity for determining the sensitivity of the first mentioned light sensitive element.

17. In a device for automatically controlling the illumination of vehicle headlights when approaching an oncoming vehicle with energized headlights, the combination of vehicle headlights, each of said headlights having a deflected beam filament and a non-deflected beam filament, a filter unit for the non-deflected beam filament and adapted to be positioned in front of said filament only when the deflected beam filament is energized, said filter unit being of a material that is opaque to visible radiation and transparent to radiations of the invisible spectrum, and light sensitive means responsive to the invisible radiations from the headlights of the oncoming car to energize said deflected beam filament and position said filter unit in front of said non-deflected beam filament.

18. In a device for automatically controlling the illumination of vehicle headlights when approaching an oncoming vehicle with energized headlights, the combination of vehicle headlights, each of said headlights having a deflected beam filament and a non-deflected beam filament, a filter unit for the non-deflected beam filament and adapted to be positioned in front of said filament only when the deflected beam filament is energized, said filter unit being of a material that is opaque to visible radiation and transparent to radiations of the invisible spectrum, and light sensitive means responsive to the invisible radiations from the headlights of the oncoming car to actuate electronically controlled relay means and thereby energize said deflected beam filament and position said filter unit in front of said non-deflected beam filament.

19. In a device for automatically controlling the illumination of vehicle headlights when approaching an oncoming vehicle with energized headlights, the combination of vehicle headlights, each of said headlights having a deflected beam filament and a non-deflected beam filament, a filter unit for the non-deflected beam filament and adapted to be positioned in front of said filament only when the deflected beam filament is energized, said filter unit being of a material that is opaque to visible radiation and transparent to radiations of the invisible spectrum, and light sensitive means including a first light sensitive element responsive to the invisible radiations from the headlights of the oncoming car to energize said deflected beam filament and position said filter unit in front of said non-deflected beam filament, said light sensitive means also including a second light sensitive element responsive to the general amount of visible and invisible radiation in its vicinity for determining the sensitivity of the first mentioned light senstive element.

20. In a device for automatically controlling the illumination of vehicle headlights when approaching an oncoming vehicle with energized headlights, the combination of vehicle headlights, each of said headlights having a deflected beam filament and a non-deflected beam filament, a filter unit for the non-deflected beam filament and adapted to be positioned in front of said filament only when the deflected beam filament is energized, said filter unit being of a material that is opaque to visible radiation and transparent to radiations of the invisible spectrum, and light sensitive means including a first light sensitive element responsive to the invisible radiations from the headlights of the oncoming car to actuate electronically controlled relay means and thereby energize said deflected beam filament and position said filter unit in front of said non-deflected beam filament, said light sensitive means also including a second light sensitive element responsive to the general amount of visible and invisible radiation in its vicinity for determining the sensitivity of the first mentioned light sensitive element.

FLOYD WILLIS, Jr.

REFERENCES CITED

The following references are of record in the file of this patent:

UNITED STATES PATENTS

| Number | Name | Date |
| --- | --- | --- |
| 1,774,457 | Singleton | Aug. 26, 1930 |
| 1,999,527 | Ronning | Apr. 30, 1935 |
| 2,240,843 | Gillespie | May 6, 1941 |